United States Patent
Kim et al.

(10) Patent No.: US 9,479,006 B2
(45) Date of Patent: Oct. 25, 2016

(54) METHOD AND APPARATUS FOR AVOIDING NOISE IN NON-CONTACT CHARGING SYSTEM

(75) Inventors: Jung-Kun Kim, Suwon-si (KR); Won-Bae Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1016 days.

(21) Appl. No.: 13/468,909

(22) Filed: May 10, 2012

(65) Prior Publication Data

US 2012/0286727 A1    Nov. 15, 2012

(30) Foreign Application Priority Data

May 12, 2011    (KR) .......................... 10-2011-0044640

(51) Int. Cl.
| | |
|---|---|
| *H02J 7/00* | (2006.01) |
| *H02J 7/02* | (2016.01) |
| *H02J 5/00* | (2016.01) |
| *H04B 5/00* | (2006.01) |

(52) U.S. Cl.
CPC ............. *H02J 7/025* (2013.01); *H04B 5/0037* (2013.01); *H02J 5/005* (2013.01); *H04B 5/0031* (2013.01)

(58) Field of Classification Search
CPC ...................................................... H02J 7/025
USPC ......................................................... 320/108
See application file for complete search history.

(56) References Cited

U.S. PATENT DOCUMENTS

| | | | |
|---|---|---|---|
| 2009/0322158 A1* | 12/2009 | Stevens et al. ............... | 307/104 |
| 2012/0194124 A1* | 8/2012 | Toivola ................... | H02J 7/025 320/108 |

* cited by examiner

*Primary Examiner* — Richard V Muralidar

(57) ABSTRACT

A wireless charging method in a wireless charging system is provided. In the method, wireless charging is performed by providing wireless charging power to a charging circuit. When both a first communication signal and a second communication signal are detected while the wireless charging is performed, the wireless charging power is isolated from the charging circuit. The wireless charging power is isolated so that noise included in the wireless charging power is not provided to the charging circuit.

11 Claims, 5 Drawing Sheets

METHOD AND APPARATUS FOR AVOIDING NOISE IN NON-CONTACT CHARGING SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on May 12, 2011, and assigned Serial No. 10-2011-0044640, the entire disclosure of which is hereby incorporated by reference.

TECHNICAL FIELD OF THE INVENTION

The present disclosure relates to non-contact charging. More particularly, the present disclosure relates to a method and an apparatus for avoiding noise occurring when non-contact charging is used in a mobile terminal.

BACKGROUND OF THE INVENTION

As functions of mobile terminals are diversified and, accordingly, power consumption increases and charging periods of the mobile terminals become short, non-contact charging is frequently used for convenience in battery charging.

While a mobile terminal performs non-contact charging, that is, wireless charging, noise may be introduced to the mobile terminal due to communication between a wireless charger reception module and a transmission module, so that wireless performance of the mobile terminal may deteriorate.

That is, since the noise occurring from a wireless charging module is included in power output from an output port of the wireless charging module during wireless charging and the included noise is not removed completely from a charger of the mobile terminal, the noise generates performance deterioration and malfunction.

SUMMARY OF THE INVENTION

To address the above-discussed deficiencies of the prior art, it is an aspect of the present disclosure is to provide a method and an apparatus for avoiding noise in a non-contact charging system.

Another aspect of the present disclosure is to provide a method and an apparatus for removing a cause having a negative influence on a mobile terminal by avoiding noise occurring from a wireless charger.

In accordance with an aspect of the present disclosure, a wireless charging method in a wireless charging system is provided. The method includes performing wireless charging by providing wireless charging power to a charging circuit. When both a first communication signal and a second communication signal are detected while performing the wireless charging, the wireless charging power is isolated from the charging circuit.

In accordance with another aspect of the present disclosure, a wireless charging apparatus configured to perform wireless charging is provided. The apparatus includes a wireless charger and a switch. The wireless charger is configured to provide wireless charging power. The switch is configured to provide the wireless charging power provided by the wireless charger to a charging circuit. When both a first communication signal and a second communication signal are detected while the switch is providing the wireless charging power to the charging circuit, the switch is further configured to isolate the wireless charging power from the charging circuit.

In accordance with still another aspect of the present disclosure, an apparatus of a mobile terminal configured to perform wireless charging is provided. The apparatus includes a modem, a wireless manager and a controller. The modem is configured to communicate with a node other than the mobile terminal. The wireless manager is configured to perform wireless charging by providing wireless charging power to a charging circuit and, when both a first communication signal and a second communication signal are detected while performing the wireless charging, to isolate the wireless charging power from the charging circuit. The controller is configured to control the modem and the wireless manager.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the disclosure as defined by the claims and their equivalents. It includes various specific details to assist in that understanding, but these are to be regarded as merely exemplary. Accordingly, those of ordinary skill in the art will recognize that various changes to and modifications of the embodiments described herein can be made without departing from the scope and spirit of the disclosure. Also, descriptions of well-known functions and constructions are omitted for clarity and conciseness.

The terms and words used in the following description and claims are not limited to the bibliographical meanings but are merely used to enable a clear and consistent understanding of the disclosure. Accordingly, it should be apparent to those skilled in the art that the following description of exemplary embodiments of the present disclosure is provided for illustration purposes only and not for the purpose of limiting the disclosure as defined by the appended claims and their equivalents.

Exemplary embodiments of the present disclosure provide a method and an apparatus for avoiding noise in a non-contact charging system.

Though it is assumed that a wireless charging system according to the present disclosure is included in a mobile terminal, the present disclosure is applicable to any apparatus or system that uses the wireless charging system and is usable without any limitation.

Figure 1:
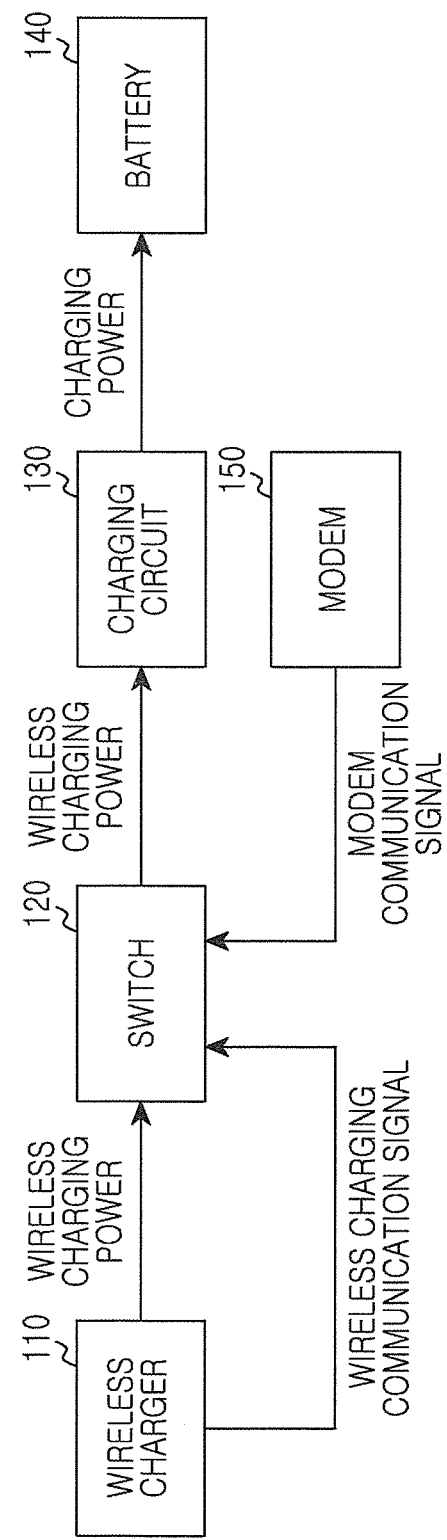
FIG. 1 is a block diagram illustrating a wireless charging system according to an exemplary embodiment of the present disclosure.

FIG. 1 is a block diagram illustrating a wireless charging system according to an exemplary embodiment of the present disclosure.

Referring to FIG. 1, the wireless charging system includes a wireless charger 110, a switch 120, a charging circuit 130, a battery 140, and a modem 150.

The wireless charger 110 serves as a module for supplying power to the charging circuit 130. The wireless charger 110 performs communication with an external wireless power transmitter (not shown) transmitting power wirelessly via a wireless power transmission signal. In addition, when performing wireless communication with the external wireless power transmitter, the wireless charger 110 provides a signal (wireless charging communication signal) informing the switch 120 that it is currently performing wireless communication.

Though the modem 150 is described using a communication modem of a mobile terminal as an example, the present disclosure is not limited by a wireless technology used by the modem. In addition, in a case of currently performing communication with a node on a different network, the modem 150 provides a signal (modem communication signal) informing the switch 120 that it is currently performing wireless communication.

When receiving a wireless charging communication signal from the wireless charger 110 and a modem communication signal from the modem 150, the switch 120 blocks and isolates wireless charging power provided by the wireless charger 110.

That is, in the case where both the wireless charging communication signal and the modem communication signal are provided, the switch 120 blocks the wireless charging power provided by the wireless charger 110, and in other cases, the switch 120 outputs the wireless charging power provided by the wireless charger 110 to the charging circuit 130.

The charging circuit 130 charges the battery 140 using the wireless charging power output from the switch 120.

Figure 2:
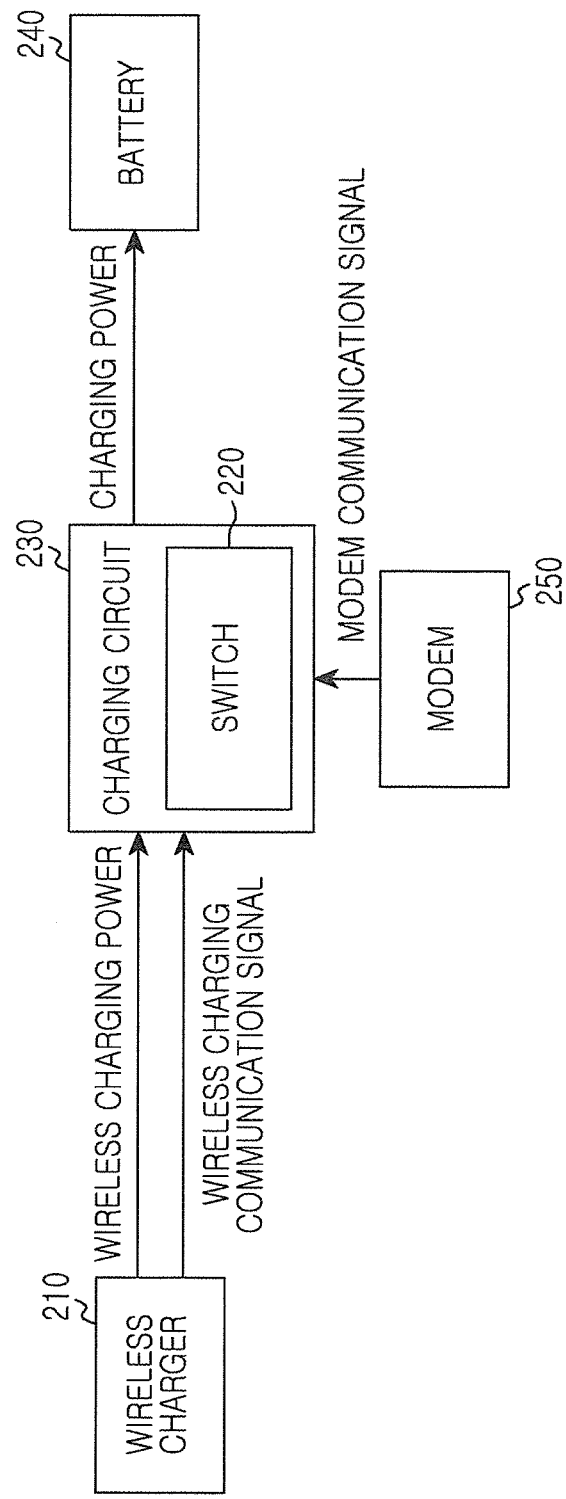
FIG. 2 is a block diagram illustrating a wireless charging, system according to another exemplary embodiment of the present disclosure.

FIG. 2 is a block diagram illustrating a wireless charging system according to another exemplary embodiment of the present disclosure.

Referring to FIG. 2, the wireless charging system includes a wireless charger 210, a switch 220, a charging circuit 230, a battery 240, and a modem 250. FIG. 2 illustrates a case where the switch 220 is included in the charging circuit 230.

The wireless charger 210 serves as a module for supplying power to the charging circuit 230. The wireless charger 210 performs communication with an external wireless power transmitter (not shown) transmitting power wirelessly via a wireless power transmission signal. In addition, when performing wireless communication with the external wireless power transmitter, the wireless charger 210 provides a signal (wireless charging communication signal) informing the switch 220 that it is currently performing wireless communication.

Though the modem 250 is described using a communication modem of a mobile terminal as an example, the present disclosure is not limited by a wireless technology used by the modem. However, in a case of currently performing communication with a node on a different network, the modem 250 provides a signal (modem communication signal) informing the switch 220 that it is currently performing wireless communication.

When receiving a wireless charging communication signal from the wireless charger 210 and a modem communication signal from the modem 250, the switch 220 blocks and isolates wireless charging power provided by the wireless charger 210.

That is, in the case where both the wireless charging communication signal and the modem communication signal are provided, the switch 220 blocks the wireless charging power provided by the wireless charger 210, and in other cases, the switch 220 outputs the wireless charging power provided by the wireless charger 210 to the charging circuit 230.

The charging circuit 230 charges the battery 240 using the wireless charging power output from the switch 220.

Figure 3:
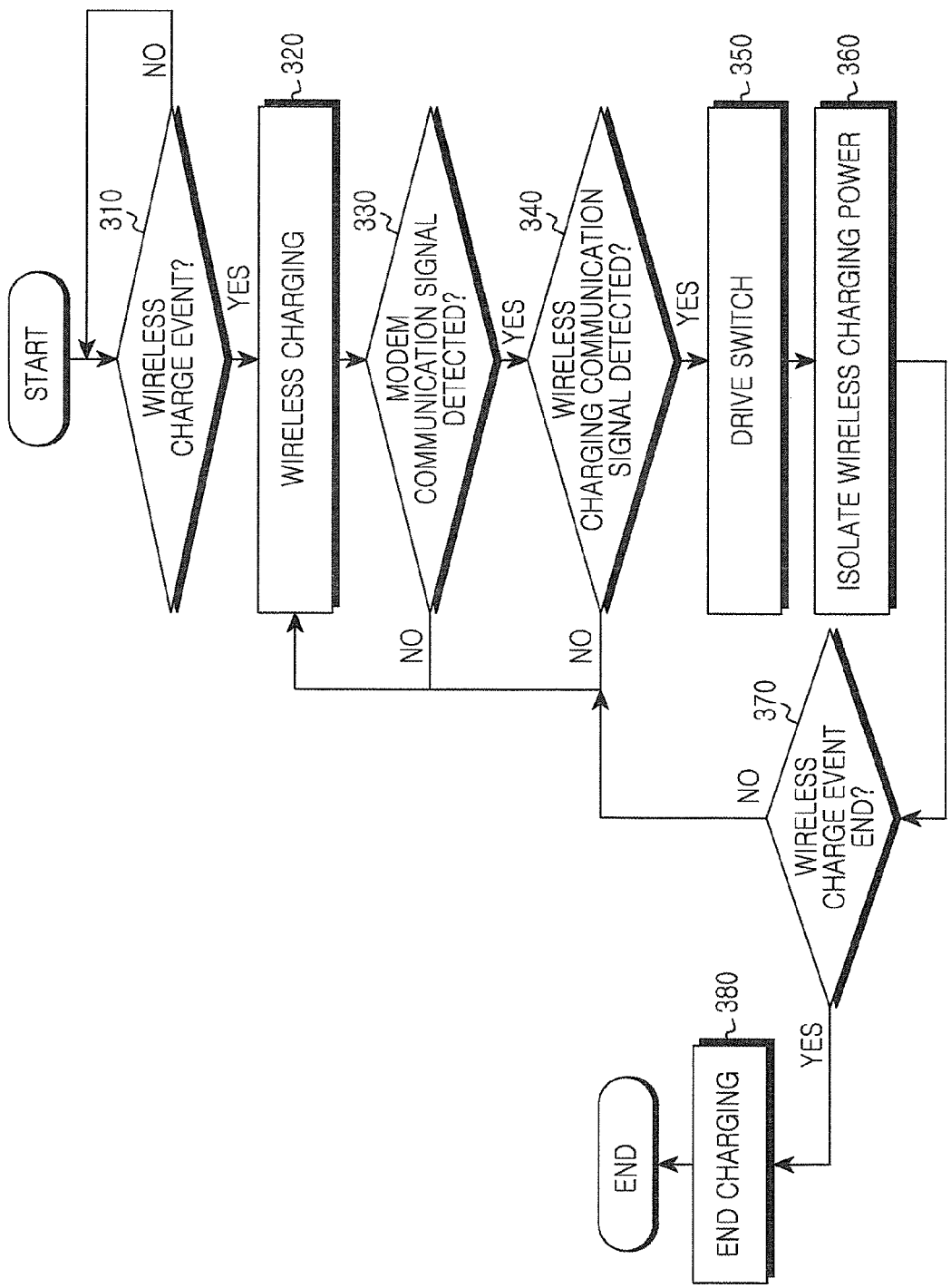
FIG. 3 is a flowchart illustrating an operation process of a wireless charging system according to an exemplary embodiment of the present disclosure.

FIG. 3 is a flowchart illustrating an operation process of a wireless charging system according to an exemplary embodiment of the present disclosure.

Referring to FIG. 3, a wireless charger of the wireless charging system determines whether a wireless charge event occurs (step 310). Whether the wireless charge event occurs may be determined by determining whether a user puts a mobile terminal having the wireless charging system on an external wireless power transmitter (not shown). In addition, for this embodiment, the wireless charge event occurs when the user puts the mobile terminal having the wireless charging system on the external wireless power transmitter. In this case, wireless charging power transmitted by the wireless power transmitter is provided to the wireless charger.

When the wireless charge event occurs (step 310), the wireless charger performs wireless charging (step 320). For example, to perform wireless charging, the switch may supply the wireless charging power provided by the wireless charger to a charging circuit. At this point, the switch of the wireless charging system determines whether a modem communication signal and a wireless charging communication signal are detected (steps 330 and 340).

When one of the modem communication signal and the wireless charging communication signal is not detected, the switch supplies the wireless charging power provided by the wireless charger to the charging circuit to perform wireless charging (step 320).

When both the modem communication signal and the wireless charging communication signal are detected, the switch drives the switch (step 350) and does not provide the wireless charging power to the charging circuit of the wireless charging system by isolating the wireless charging power provided by the wireless charger of the wireless charging system (step 360).

When detecting an end of a wireless charge event (step 370), the wireless charger ends the wireless charging (step 380). The detecting of the end of the wireless charge event may include detecting that a user has picked up a mobile terminal having the wireless charging system that had been put on the external wireless power transmitter.

When the wireless charging system does not detect the end of the wireless charge event, the switch performs wireless charging by supplying the wireless charging power provided by the wireless charger to the charging circuit (step 320).

Figure 4:
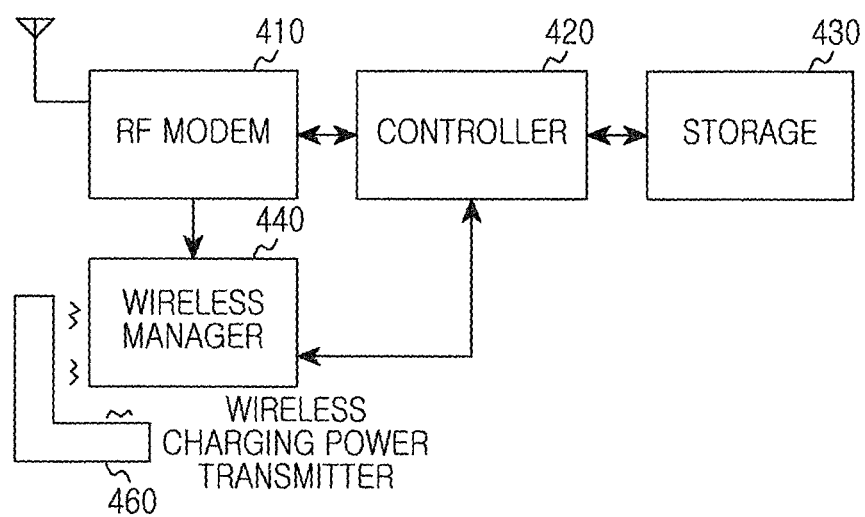
FIG. 4 is a block diagram illustrating a mobile terminal according to an exemplary embodiment of the present disclosure.

FIG. 4 is a block diagram illustrating a mobile terminal according to an exemplary embodiment of the present disclosure.

Referring to FIG. 4, the mobile terminal includes a Radio Frequency (RF) modem 410, a controller 420, a storage 430, and a wireless manager 440. The controller 420 may control the wireless manager 440.

The RF modem 410 serves as a module for communicating with a different apparatus. The RF modem 410 includes a radio processor and a baseband processor. The radio processor converts a signal received via an antenna to a baseband signal to provide the same to the baseband processor, and converts a baseband signal from the baseband processor to an RF signal so that it can be transmitted on an actual radio path, and transmits the same via the antenna. Any apparatus may serve as the different apparatus as long as it can receive an output of the mobile terminal.

The controller 420 controls an overall operation of the mobile terminal, and particularly, controls the wireless manager 110 according to the present disclosure.

The storage 430 stores a program for controlling an overall operation of the mobile terminal and stores temporary data occurring during execution of a program.

The wireless manager 440 represents a portion that excludes the modem in the wireless charging system illustrated in FIGS. 1 and 2. The wireless manager 440 includes a wireless charger, a switch, a charging circuit, and a battery. The switch may be included in the charging circuit.

A wireless charging power transmitter 460 represents the above-described external wireless power transmitter. The wireless charging power transmitter 460 provides a wireless charging communication signal informing the wireless charger of the wireless manager 440 that wireless charging power and wireless communication are being performed. That is, the wireless charging, power transmitter 460 may communicate with the wireless charger using the wireless charging power.

Figure 5:
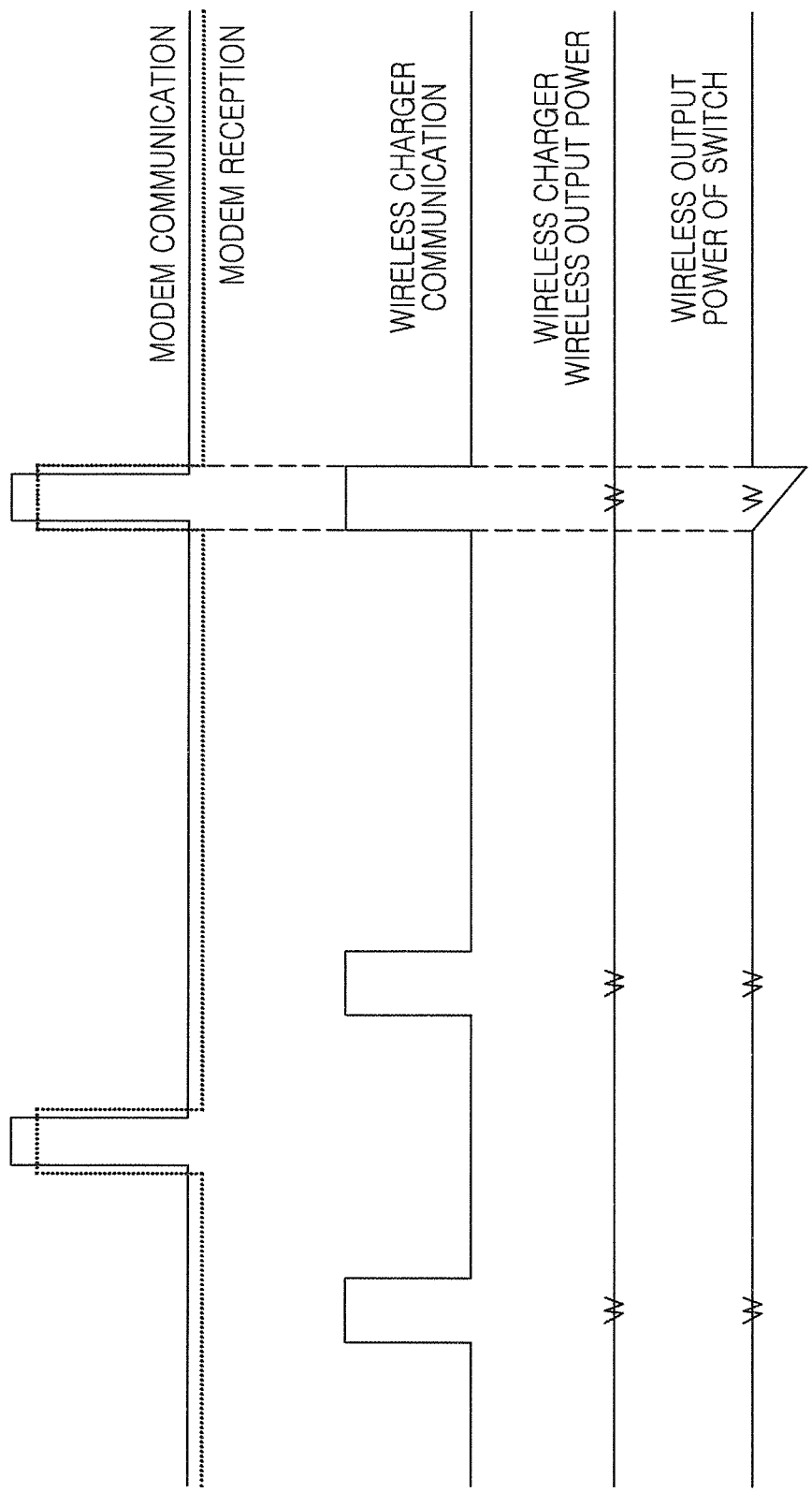
FIG. 5 is a diagram illustrating an operation waveform while a wireless charging system operates according to an exemplary embodiment of the present disclosure.

FIG. 5 is a diagram illustrating an operation waveform while a wireless charging system operates according to an exemplary embodiment of the present disclosure.

Referring to FIG. 5, in the case where a mobile terminal is in communication (particularly, reception) via a modem and a wireless charger is in communication with a wireless charging power transmitter, a switch may isolate wireless charging power provided by the wireless charger to prevent noise included in wireless charging power output from the wireless charger via the switch from being introduced.

The present disclosure has an advantage of preventing performance deterioration and malfunction by avoiding noise occurring from a wireless charger and removing a cause having a negative influence on a mobile terminal.

It will be appreciated that embodiments of the present disclosure according to the claims and description in the specification can be realized in the form of hardware, software or a combination of hardware and software.

Any such software may be stored in a computer-readable storage medium. The computer-readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically- or magnetically-readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless charging method in a mobile terminal, the method comprising:
    performing, at a wireless charger, wireless charging by providing wireless charging power to a charging circuit, the wireless charging power being received from an external wireless charging power transmitter; and
    isolating, at a switch, when at least one communication signal is detected while providing the wireless charging power to the charging circuit, the wireless charging power that is provided to the charging circuit such that the wireless charging power, provided from the charging circuit to a battery, is isolated,
    wherein the at least one communication signal indicates that the mobile terminal is currently performing a communication with at least one external apparatus.

2. The method of claim 1, further comprising, when not detecting the at least one communication signal, providing the wireless charging power to the charging circuit again to perform the wireless charging.

3. The method of claim 1, further comprising receiving the wireless charging power from the external wireless charging power transmitter before performing the wireless charging.

4. The method of claim 1, wherein the at least one communication signal comprises a modem communication signal.

5. The method of claim 1, wherein the at least one communication signal comprises a wireless charging communication signal.

6. A mobile terminal for performing wireless charging, the mobile terminal comprising:
- a modem configured to communicate with at least one external apparatus through an antenna;
- a wireless charger;
- a switch;
- a charging circuit configured to charge a battery using a wireless charging power provided via the switch;
- the battery; and
- a controller configured to:
  - control the wireless charger to perform wireless charging by providing wireless charging power to the charging circuit, the wireless charging power being received from an external wireless charging power transmitter; and
  - control the switch to isolate, when at least one communication signal is detected while providing the wireless charging power to the charging circuit, the wireless charging power that is provided to the charging circuit such that the wireless charging power, provided from the charging circuit to the battery, is isolated, wherein the at least one communication signal indicates that the mobile terminal is currently performing a communication with the at least one external apparatus.

7. The mobile terminal of claim 6, wherein when the at least one communication signal is not detected, the switch is further configured to provide the wireless charging power to the charging circuit again.

8. The mobile terminal of claim 6, wherein the wireless charger is configured to receive the wireless charging power from the external wireless charging power transmitter before providing the wireless charging power.

9. The mobile terminal of claim 6, wherein the at least one communication signal comprises a modem communication signal provided by the modem.

10. The mobile terminal of claim 6, wherein the at least one communication signal comprises a wireless charging communication signal provided by the wireless charger.

11. The mobile terminal of claim 6, wherein the switch is integrated in the charging circuit.

\* \* \* \* \*